(12) United States Patent
Yamago et al.

(10) Patent No.: US 10,808,065 B2
(45) Date of Patent: Oct. 20, 2020

(54) METHOD FOR PRODUCING MULTIBRANCHED POLYMER AND MULTIBRANCHED POLYMER

(71) Applicants: Kyoto University, Kyoto-shi, Kyoto (JP); OTSUKA CHEMICAL CO., LTD, Osaka-shi, Osaka (JP)

(72) Inventors: Shigeru Yamago, Kyoto (JP); Minoru Yamamoto, Tokushima (JP)

(73) Assignees: KYOTO UNIVERSITY, Kyoto (JP); OTSUKA CHEMICAL CO., LTD., Osaka (JP)

( * ) Notice: Subject to any disclaimer, the term of this patent is extended or adjusted under 35 U.S.C. 154(b) by 112 days.

(21) Appl. No.: 16/096,825

(22) PCT Filed: Apr. 21, 2017

(86) PCT No.: PCT/JP2017/016008
§ 371 (c)(1),
(2) Date: Oct. 26, 2018

(87) PCT Pub. No.: WO2017/191766
PCT Pub. Date: Nov. 9, 2017

(65) Prior Publication Data
US 2019/0106524 A1    Apr. 11, 2019

(30) Foreign Application Priority Data
May 2, 2016 (JP) ................................ 2016-092424

(51) Int. Cl.
*C08F 293/00* (2006.01)
*C08F 230/00* (2006.01)
(Continued)

(52) U.S. Cl.
CPC ............ *C08F 293/005* (2013.01); *C08F 2/38* (2013.01); *C08F 4/00* (2013.01); *C08F 230/00* (2013.01); *C08F 2438/00* (2013.01)

(58) Field of Classification Search
None
See application file for complete search history.

(56) References Cited

U.S. PATENT DOCUMENTS

| | | | | |
|---|---|---|---|---|
| 5,789,487 A | * | 8/1998 | Matyjaszewski | ......... C08F 2/38 525/268 |
| 6,255,424 B1 | * | 7/2001 | Knauss | ................. C08F 257/02 526/329 |

(Continued)

FOREIGN PATENT DOCUMENTS

| | | |
|---|---|---|
| CN | 101553571 A | 10/2009 |
| EP | 2 079 844 A1 | 7/2009 |

(Continued)

OTHER PUBLICATIONS

Extended (Supplementary) European Search Report dated Dec. 11, 2019, issued in counterpart application No. 17792699.5. (7 pages).
(Continued)

*Primary Examiner* — Satya B Sastri
(74) *Attorney, Agent, or Firm* — Westerman, Hattori, Daniels & Adrian, LLP

(57) ABSTRACT

Provided are a method for producing a multibranched polymer that can produce a multibranched polymer having a narrow molecular weight distribution in a one-pot procedure and the multibranched polymer. A method for producing a multibranched polymer includes the step of polymerizing a first vinyl monomer having a polymerization-initiating group in an α-position of a vinyl bond and a second vinyl monomer free of polymerization-initiating group in an α-position of a vinyl bond by a living radical polymerization.

4 Claims, 1 Drawing Sheet

(51) Int. Cl.
*C08F 2/38* (2006.01)
*C08F 4/00* (2006.01)

(56) References Cited

U.S. PATENT DOCUMENTS

| | | | | |
|---|---|---|---|---|
| 6,541,580 | B1* | 4/2003 | Matyjaszewski | C08F 2/38 526/113 |
| 6,653,407 | B2* | 11/2003 | Berge | C08F 290/04 525/242 |
| 9,777,082 | B2* | 10/2017 | Pugh | C08G 83/005 |
| 2011/0046334 | A1 | 2/2011 | Pugh et al. | |
| 2013/0190473 | A1 | 7/2013 | Nagasawa et al. | |
| 2014/0235755 | A1* | 8/2014 | Gopalan | C08F 14/16 523/400 |
| 2015/0266986 | A1* | 9/2015 | Wang | C08F 220/28 424/618 |
| 2016/0297755 | A1 | 10/2016 | Bando et al. | |

FOREIGN PATENT DOCUMENTS

| | | |
|---|---|---|
| EP | 3 075 748 A1 | 10/2016 |
| JP | 6-322013 A | 11/1994 |
| JP | 8-81513 A | 3/1996 |
| JP | 8-176114 A | 7/1996 |
| JP | 8-217741 A | 8/1996 |
| JP | 2005-298768 A | 10/2005 |
| JP | 2008-291216 A | 12/2008 |
| JP | 2010-506000 A | 2/2010 |
| JP | 2013-148798 A | 8/2013 |
| WO | 2008/045299 A1 | 4/2008 |
| WO | 2015/080189 A1 | 6/2015 |

OTHER PUBLICATIONS

Notification of Transmittal of Translation of the International Preliminary Report on Patentability (Form PCT/IB/338) issued in counterpart International Application No. PCT/JP2017/016008 dated Nov. 15, 2018, with Forms PCT/IB/373 and PCT/ISA/237. (6 pages).
International Search Report dated Aug. 1, 2017, issued in counterpart International Application No. PCT/JP2017/016008 (2 pages).
Office Action dated Jul. 9, 2020, issued in counterpart to CN Application No. 201780027425.3, with English translation. (12 pages).

* cited by examiner

[FIG. 1]
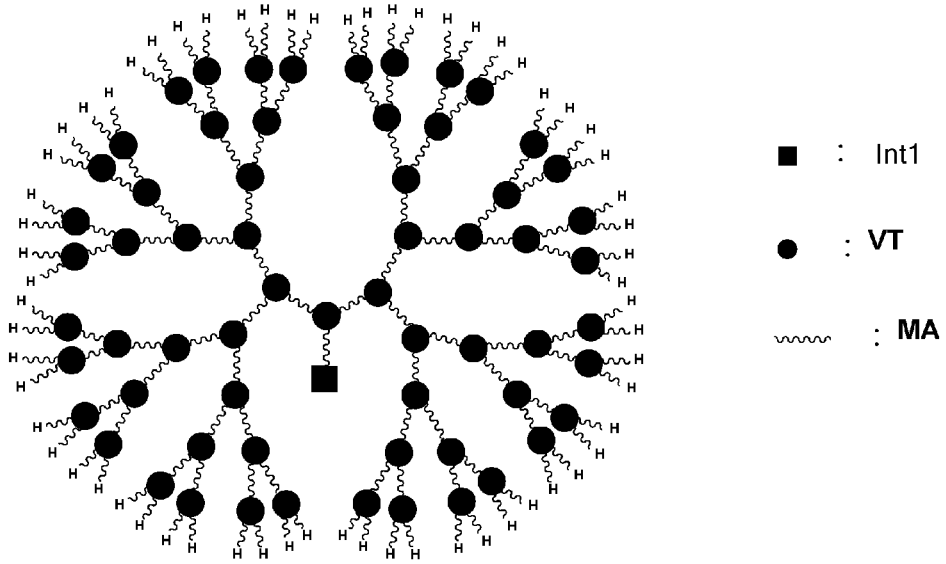
[FIG. 2]
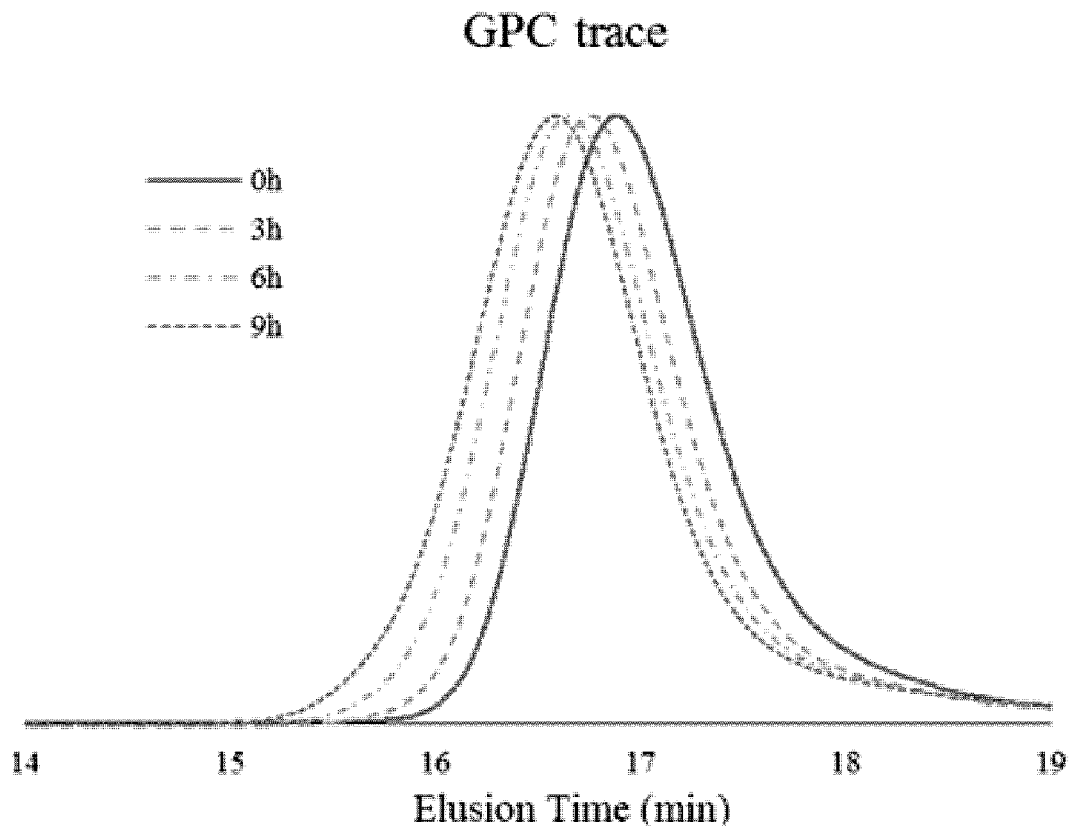

METHOD FOR PRODUCING MULTIBRANCHED POLYMER AND MULTIBRANCHED POLYMER

TECHNICAL FIELD

The present invention relates to methods for producing multibranched polymers and multibranched polymers.

BACKGROUND ART

Multibranched polymers are polymers having many branching structures, as represented by a dendron (arborization) and a dendrimer. Multibranched polymers have small hydrodynamic radii as compared to straight-chain polymers and, therefore, have features of significantly improved solubility, significantly reduced viscosity, significantly variable glass transition temperature, and so on. Hence, their uses are being widely considered in the medical care industry, the chemical industry, and so on.

There are heretofore known two methods as methods for synthesizing a multibranched polymer. One of the known methods is a method for synthesizing a dendrimer, that is, a method of reacting an $AB_2$ type monomer (wherein A and B are organic groups having different functional groups a and b and the functional groups a and b can cause a chemical condensation reaction or a chemical addition reaction with each other) in stages (see Scheme 1 below). Thus, a polymer having a structure in which polymer chains are dendritically branched from a molecule forming a core is obtained, but the obtained polymer has an uneven branching structure and is polydisperse because of mutual reactions between monomers, between oligomers, and between polymers. Although there is also known a method capable of providing a monodisperse polymer having a regularly and perfectly dendritic branching structure, its production process is very complicated. Therefore, no cases are heretofore known in which a dendrimer has been put to practical use.

Scheme 1: Method Using $AB_2$ Type Monomer

[Chem. 1]

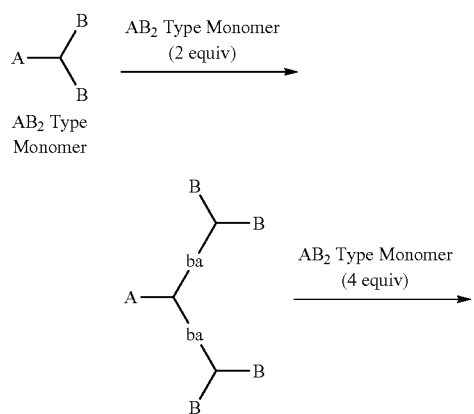
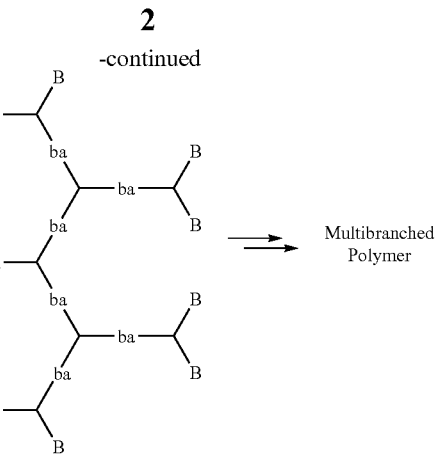

The other of the above known methods is a method for synthesizing a multibranched polymer, using a monomer referred to as an inimer and having a polymerizable functional group and a polymerization-initiating group in the same molecule (see Scheme 2 below, where B* represents a polymerization-initiating group). As an example thereof, Patent Literature 1 is disclosed.

Scheme 2: Method Using Inimer

[Chem. 2]

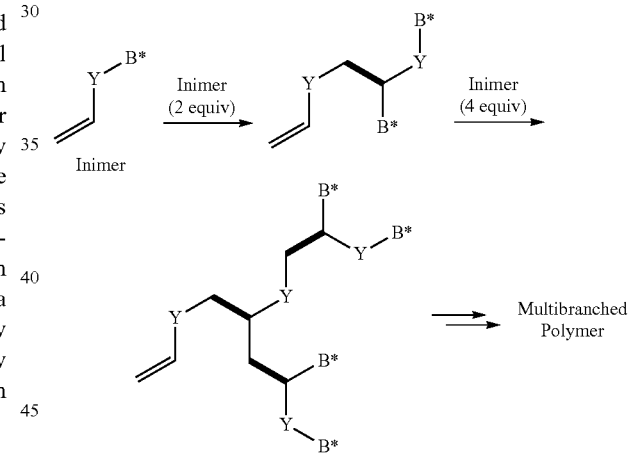

CITATION LIST

Patent Literature

Patent Literature 1: JP-A-2013-148798

SUMMARY OF INVENTION

Technical Problem

The production method using an inimer is easy as seen from Patent Literature 1, but has difficulty in controlling polymerization because the polymerizable functional group and the polymerization-initiating group are not combined in terms of reactivity. Therefore, mutual reactions occur between monomers, between oligomers, and between polymers, which arises a problem of generation of a polymer having an uneven branching structure and being polydisperse, that is, having a wide molecular weight distribution. In addition, there is a need to first separately produce an inimer and then produce a multibranched polymer.

An object of the present invention is to solve the problem with the inimer, provide a method for producing a multibranched polymer that can produce a multibranched polymer having a narrow molecular weight distribution in a one-pot procedure, and provide the multibranched polymer.

Solution to Problem

The present invention provides the following method for producing a multibranched polymer and the following multibranched polymer.

Aspect 1: A method for producing a multibranched polymer, the method including the step of polymerizing a first vinyl monomer having a polymerization-initiating group in an α-position of a vinyl bond and a second vinyl monomer free of polymerization-initiating group in an α-position of a vinyl bond by a living radical polymerization.

Aspect 2: The method for producing a multibranched polymer according to aspect 1, wherein the living radical polymerization is a living radical polymerization in which an organotellurium compound represented by the following general formula (5), general formula (6), general formula (7) or general formula (8) or a macro-chain transfer agent obtained from the organotellurium compound is used as a chain transfer agent.

[Chem. 3]

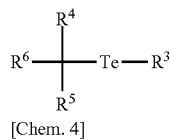

(5)

[Chem. 4]

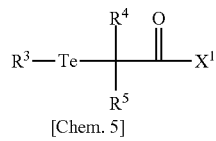

(6)

[Chem. 5]

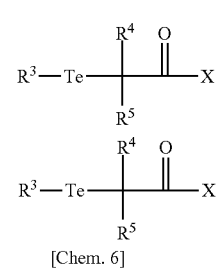

(7)

[Chem. 6]

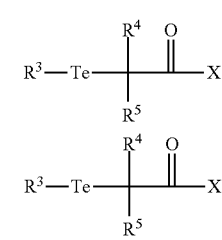

(8)

In the general formulae (5) to (8), $R^3$ represents an alkyl group having 1 to 8 carbon atoms, an aryl group or an aromatic heterocyclic group, $R^4$ and $R^5$ each independently represent a hydrogen atom or an alkyl group having 1 to 8 carbon atoms, $R^6$ represents an alkyl group having 1 to 8 carbon atoms, an aryl group, a substituted aryl group, an aromatic heterocyclic group, an alkoxy group, an acyl group, an amide group, an oxycarbonyl group, a cyano group, an allyl group or a propargyl group, $R^7$ represents an alkylene group having 1 to 18 carbon atoms, $X^1$ represents an oxygen atom or —NZ— where N represents a nitrogen atom and Z represents s hydrogen atom, an alkyl group having 1 to 8 carbon atoms or a phenyl group, $X^2$ in the general formula (6) represents a divalent organic group, $X^2$ in the general formula (7) represents a trivalent organic group, and $X^2$ in the general formula (8) represents a tetravalent organic group.

Aspect 3: The method for producing a multibranched polymer according to aspect 1 or 2, wherein the first vinyl monomer is a vinyl monomer represented by general formula (9) below.

[Chem. 7]

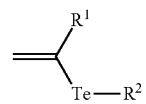

(9)

In the general formula (9), $R^1$ represents a hydrogen atom, an alkyl group having 1 to 8 carbon atoms, an aryl group, an aromatic heterocyclic group, an alkoxy group, an acyl group, an amide group, an oxycarbonyl group or a cyano group, and $R^2$ represents an alkyl group having 1 to 8 carbon atoms, an aryl group, an aromatic heterocyclic group, a silyl group or a fluorine atom.

Aspect 4: The method for producing a multibranched polymer according to any one of aspects 1 to 3, wherein a use ratio of the first vinyl monomer to the second vinyl monomer (first vinyl monomer vs second vinyl monomer) is, in molar ratio, 0.01:99.99 to 50:50.

Aspect 5: A multibranched polymer produced by the method for producing a multibranched polymer according to any one of aspects 1 to 4.

Aspect 6: A multibranched polymer containing a structural unit derived from a first vinyl monomer having a polymerization-initiating group in an α-position of a vinyl bond and a structural unit derived from a second vinyl monomer free of polymerization-initiating group in an α-position of a vinyl bond.

Aspect 7: The multibranched polymer according to aspect 6, having a molecular weight distribution (PDI) of less than 2.5 measured by a GPC method.

Aspect 8: The multibranched polymer according to aspect 6 or 7, having an absolute molecular weight of 1,000 to 3,000,000.

Advantageous Effects of Invention

The present invention enables provision of a method for producing a multibranched polymer that can produce a multibranched polymer having a narrow molecular weight distribution in a one-pot procedure and the multibranched polymer.

BRIEF DESCRIPTION OF DRAWINGS

FIG. 1 is a schematic diagram showing a molecular structure of a multibranched polymer obtained in Example 1.

FIG. 2 is a graph showing GPC traces over time in Example 1.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<Production Method>

A production method according to the present invention is a production method including the step of polymerizing a first vinyl monomer having a polymerization-initiating group in an α-position of a vinyl bond and a second vinyl monomer free of polymerization-initiating group in an α-position of a vinyl bond by a living radical polymerization. The "vinyl bond" in the present invention refers to a radically polymerizable carbon-carbon double bond and the "vinyl monomer" in the present invention refers to a monomer whose molecule has a radically polymerizable carbon-carbon double bond.

No particular limitation is placed on the type of the first vinyl monomer so long as it is a vinyl monomer having a functional group (polymerization-initiating group) functioning as a polymerization initiation site for living radical polymerization in the α-position of the vinyl bond, but the following general formula (1) is preferably used.

[Chem. 8]

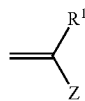

(1)

In the general formula (1), Z represents a polymerization-initiating group and $R^1$ represents a hydrogen atom, an alkyl group having 1 to 8 carbon atoms, an aryl group, an aromatic heterocyclic group, an alkoxy group, an acyl group, an amide group, an oxycarbonyl group or a cyano group.

The group represented as $R^1$ is, as described above, a hydrogen atom, an alkyl group having 1 to 8 carbon atoms, an aryl group, an aromatic heterocyclic group, an alkoxy group, an acyl group, an amide group, an oxycarbonyl group, a cyano group, a silyl group or a fluorine atom and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. In the above alkyl group, its heteroatom functional group may be substituted with a substituent. Preferred are linear or branched alkyl groups having 1 to 8 carbon atoms.

Examples of the aryl group include a phenyl group and a naphthyl group.

Examples of the aromatic heterocyclic group include a pyridyl group, a furyl group, and a thienyl group.

The preferred alkoxy group is a group in which an alkyl group having 1 to 8 carbon atoms is bonded to an oxygen atom, and examples include a methoxy group, an ethoxy group, a propoxy group, an isopropoxy group, an n-butoxy group, a sec-butoxy group, a tert-butoxy group, a pentyloxy group, a hexyloxy group, a heptyloxy group, and an octyloxy group.

Examples of the acyl group include an acetyl group, a propionyl group, and a benzoyl group.

An example of the amide group is $-CONR^{111}R^{112}$ (where $R^{111}$ and $R^{112}$ are each independently a hydrogen atom, an alkyl group having 1 to 8 carbon atoms or an aryl group).

The preferred oxycarbonyl group is a group represented by $-COOR^{12}$ (where $R^{12}$ is a hydrogen atom, an alkyl group having 1 to 8 carbon atoms or an aryl group) and examples include a carboxyl group, a methoxycarbonyl group, an ethoxycarbonyl group, a propioxycarbonyl group, an n-butoxycarbonyl group, a sec-butoxycarbonyl group, a ter-butoxycarbonyl group, an n-pentoxycarbonyl group, and a phenoxycarbonyl group. Preferred oxycarbonyl groups are a methoxycarbonyl group and an ethoxycarbonyl group.

Examples of the silyl group include a trimethylsilyl group and a triethylsilyl group.

The group represented by Z is a polymerization-initiating group and the type thereof is not particularly limited so long as it is a functional group (polymerization-initiating group) functioning as a polymerization initiation site for living radical polymerization. Examples of the polymerization-initiating group include $-Te-R^2$, $-Cl$, $-Br$, $-I$, $-SC(=S)R^2$, $-SC(=S)OR^2$, and $-S(C=S)NR^2_2$. Among them, $-Te-R^2$ is preferred as the polymerization-initiating group from the viewpoint of the variety of usable monomers.

The group represented as $R^2$ is an alkyl group having 1 to 8 carbon atoms, an aryl group or an aromatic heterocyclic group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

If the first vinyl monomer used in the present invention is, for example, a compound represented by the following general formula (2), the bond dissociation energy of C—TeMe in the compound can be calculated to be 216 kJ/mol by molecular orbital calculation. Furthermore, for example, the bond dissociation energy of C—TeMe in the following general formula (3) can be calculated to be 160 kJ/mol. For example, the following general formula (4) represents a chain transfer agent for a living radical polymerization method using an organotellurium compound (TERP method) and the bond dissociation energy of C—TeMe thereof can be calculated to be 154 kJ/mol.

[Chem. 9]

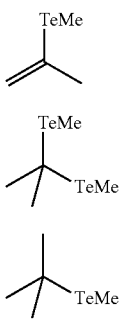

(2)
(3)
(4)

It can be considered from these calculation results that the polymerization-initiating group in the first vinyl monomer does not function as a polymerization-initiating group as it stands because it is linked directly to an sp$^2$ carbon (namely, it is present in the α-position of the vinyl bond), and does not function as a polymerization-initiating group till the vinyl bond of the first vinyl monomer becomes a bond to an sp$^3$ carbon by radical polymerization. The polymerizable functional group (vinyl bond) and the polymerization-initiating group can be considered to be thus combined in terms of reactivity and uniform control of the branching structure can be considered to be made possible by polymerizing the first vinyl monomer (hereinafter, also referred to as a branmer) for use in the present invention by living radical polymerization using a chain transfer agent (see Scheme 3 below, where B* represents a polymerization-initiating group). By further using the second vinyl monomer to be described hereinafter in combination, a multibranched polymer can be produced in which the molecular weight, the degree of branching, and so on are highly controlled.

initiating group in its molecule. Specifically, examples include the following vinyl monomers. In the present invention, "(meth)acrylic" refers to "at least one of acrylic and methacrylic", "(meth)acrylic acid" refers to "at least one of acrylic acid and methacrylic acid", and "(meth)acrylate" refers to "at least one of acrylate and methacrylate".

(Meth)acrylates having an aliphatic alkyl group, including ethyl (meth)acrylate, n-propyl (meth)acrylate, n-butyl (meth)acrylate, isobutyl (meth)acrylate, sec-butyl (meth)acrylate, tert-butyl (meth)acrylate, and 2-ethylhexyl (meth)acrylate;

(Meth)acrylates having an alicyclic alkyl group, including cyclohexyl (meth)acrylate, methylcyclohexyl (meth)acrylate, cyclododecyl (meth)acrylate, bornyl (meth)acrylate, and isobornyl (meth)acrylate;

(Meth)acrylates having an aromatic ring group, including benzyl (meth)acrylate, phenyl (meth)acrylate, and phenoxyethyl (meth)acrylate;

(Meth)acrylates having a hydroxyl group, including 2-hydroxyethyl (meth)acrylate, 3-hydroxypropyl (meth)acrylate, 2-hydroxypropyl (meth)acrylate, and 4-hydroxybutyl (meth)acrylate;

(Meth)acrylates having a polyethylene glycol structural unit, including diethylene glycol mono(meth)acrylate, triethylene glycol mono(meth)acrylate, tetraethylene glycol mono(meth)acrylate, polyethylene glycol mono(meth)acrylate, methoxydiethylene glycol (meth)acrylate, methoxytriethylene glycol (meth)acrylate, methoxytetraethylene glycol (meth)acrylate, and methoxypolyethylene glycol (meth)acrylate;

Aromatic vinyl monomers, including styrene, alpha-methylstyrene, 4-methylstyrene, 2-methylstyrene, 3-methylstyrene, 4-methoxystyrene, 2-hydroxymethylstyrene, and 1-vinylnaphthalene;

Vinyl monomers having a carboxyl group, including (meth)acrylic acid, crotonic acid, maleic acid, itaconic acid, Scheme 3: Method Using Branmer

[Chem. 10]

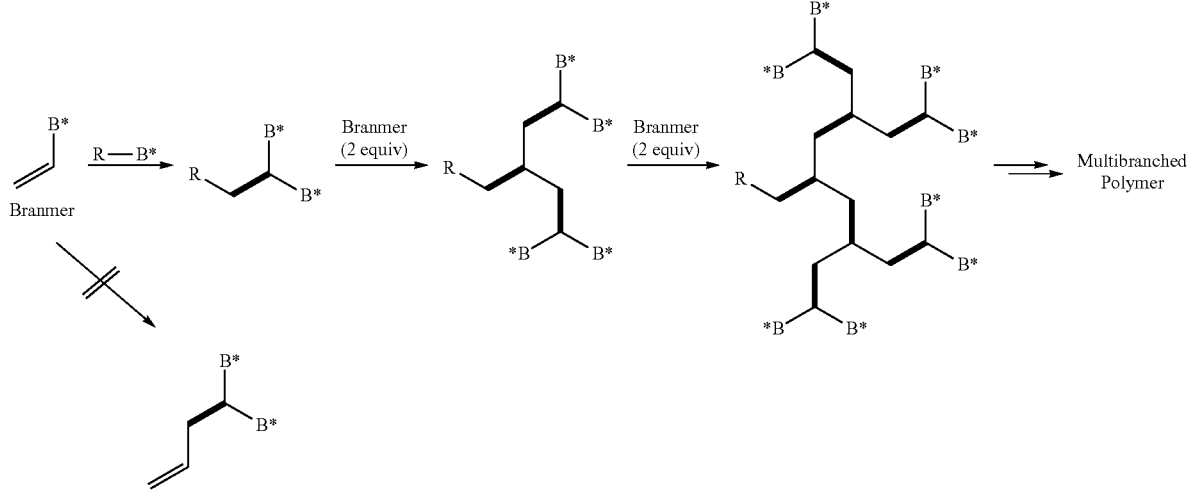

Any vinyl monomer will work as the second vinyl monomer if the α-position of its vinyl bond is free of the polymerization-initiating group shown in the above first vinyl monomer and if it is radically polymerizable, but the second vinyl monomer is preferably free of polymerizationand monomers formed by reacting hydroxyalkyl (meth)acrylate, such as 2-hydroxyethyl (meth)acrylate or 4-hydoxybutyl (meth)acrylate, with an acid anhydride, such as maleic anhydride, succinic anhydride or phthalic anhydride;

Vinyl monomers having a sulfonic acid group, including styrene sulfonic acid, (meth)acrylamide dimethyl propyl sulfonic acid, ethyl (meth)acrylate sulfonic acid, ethyl (meth)acrylamide sulfonic acid, and vinyl sulfonic acid;

Vinyl monomers having a phosphoric acid group, including methacryloyloxyethyl phosphoric acid esters;

(Meth)acrylamides, including (meth)acrylamide, N-methyl(meth)acrylamide, N-isopropyl(meth)acrylamide, and N,N-dimethyl(meth)acrylamide;

Tertiary amine-containing unsaturated monomers, including N,N-dimethylaminopropyl(meth)acrylamide, N,N-dimethylaminoethyl(meth)acrylamide, 2-(dimethylamino)ethyl (meth)acrylate, and N,N-dimethylaminopropyl (meth)acrylate;

Quaternary ammonium base-containing unsaturated monomers, including
N-2-hydroxy-3-acryloyloxypropyl-N,N,N-trimethylammonium chloride, and
N-methacryloylaminoethyl-N,N,N-dimethylbenzylammonium chloride;

Epoxy-containing unsaturated monomers, such as glycidyl (meth)acrylate;

Heterocyclic ring-containing unsaturated monomers, including 2-vinylthiophene, N-methyl-2-vinylpyrrole, 1-vinyl-2-pyrrolidone, 2-vinylpyridine, and 4-vinylpyridine;

Vinylamides, including N-vinylformamide and N-vinylacetamide;

α-olefins, including 1-hexene, 1-octene, and 1-decene;

Dienes, including butadiene, isoprene, 4-methyl-1,4-hexadiene, and 7-methyl-1,6-octadiene;

(Meth)acrylonitrile; methyl vinyl ketone; vinyl chloride; and vinylidene chloride.

Preferred among them are (meth)acrylates having an aliphatic alkyl group, (meth)acrylates having an alicyclic alkyl group, (meth)acrylates having a hydroxyl group, aromatic vinyl monomers, (meth)acylamides, tertiary amine-containing unsaturated monomers, and heterocyclic ring-containing unsaturated monomers.

The living radical polymerization uses different chain transfer agents depending on the technique for stabilizing polymerization growing ends. Examples of the technique include the method using a transition metal catalyst (ATRP method), the method using a sulfur-based, reversible chain-transfer agent (RAFT method), the method using an organotellurium compound (TERP method), and the method using an organic iodine compound. Preferred among them is the TERP method from the viewpoint of the variety of usable monomers.

In the production method according to the present invention, the average number of branches of a produced multibranched polymer having a dendrimer structure can be controlled by controlling the amount of the first vinyl monomer used relative to a chain transfer agent for polymerization. Specifically, in order to synthesize an Nth-generation dendrimer, the first vinyl monomer is used in an amount of $(2^N-1)$ mol per mol of chain transfer agent. The number of generations, N, that can be produced is 1 or anymore and N is preferably 1 to 15 and more preferably 3 to 10.

Because the average number of branched chains of the multibranched polymer having a dendrimer structure produced according to the present invention is $[2^{(N+1)}-1]$, the amount of the second vinyl monomer used per mol of chain transfer agent in the production method according to the present invention is preferably an amount of more than $[2^{(N+1)}-1]$ mol per mol of chain transfer agent and can be arbitrarily selected according to a desired dendrimer structure. The amount of the second vinyl monomer used per mol of chain transfer agent is more preferably an amount equivalent to 1 to 10,000 times the average number of molecular chains and still more preferably an amount equivalent to 5 to 1,000 times the average number of molecular chains.

The amount of the second vinyl monomer used in the production method according to the present invention may be, for example, per mole of chain transfer agent, 10 to 50,000 mol, preferably 25 to 10,000 mole, more preferably 50 to 5,000 mol, and still more preferably 75 to 1,000 mol.

The use ratio of the first vinyl monomer to the second vinyl monomer (first vinyl monomer vs second vinyl monomer) in the production method according to the present invention may be, for example, in molar ratio, 0.01:99.99 to 50:50, preferably 0.1:99.9 to 25:75, more preferably 0.1:99.9 to 20:80, and still more preferably 0.5:99.5 to 15:85.

(Polymerization Method (TERP Method))

The method using an organotellurium compound (TERP method) is a living radical polymerization in which an organotellurium compound represented by the following general formula (5), general formula (6), general formula (7) or general formula (8), a macro-chain transfer agent obtained from the organotellurium compound (both of which are hereinafter collectively referred to simply as an organotellurium compound) or the like is used as the chain transfer agent. In the TERP method, one of organotellurium compounds may be selectively used or two or more of them may be used in combination.

The macro-chain transfer agent refers to a vinyl polymer obtained by polymerizing a vinyl monomer by a living radical polymerization using an organotellurium compound represented by the general formula (5), the general formula (6), the general formula (7) or the general formula (8) below and can be used as the chain transfer agent for living radical polymerization because the growing ends of the vinyl copolymer have the form of —TeR³ (where R³ is the same as described below) derived from the tellurium compound. The vinyl monomer can be arbitrarily selected according to the structure of a desired multibranched polymer, for example, from among various types of second vinyl monomers.

[Chem. 11]

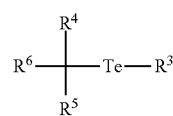

(5)

[Chem. 12]

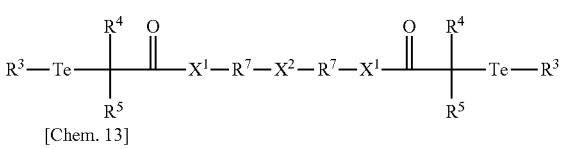

(6)

[Chem. 13]

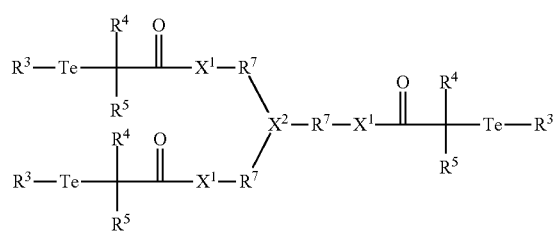

(7)

[Chem. 14]

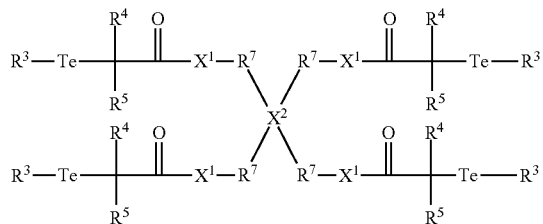

(8)

In the general formulae (5) to (8), $R^3$ represents an alkyl group having 1 to 8 carbon atoms, an aryl group or an aromatic heterocyclic group, $R^4$ and $R^5$ each independently represent a hydrogen atom or an alkyl group having 1 to 8 carbon atoms, $R^6$ represents an alkyl group having 1 to 8 carbon atoms, an aryl group, a substituted aryl group, an aromatic heterocyclic group, an alkoxy group, an acyl group, an amide group, an oxycarbonyl group, a cyano group, an allyl group or a propargyl group, $R^7$ represents an alkylene group having 1 to 18 carbon atoms, $X^1$ represents an oxygen atom or —NZ— where N represents a nitrogen atom and Z represents s hydrogen atom, an alkyl group having 1 to 8 carbon atoms or a phenyl group, $X^2$ in the general formula (6) represents a divalent organic group, $X^2$ in the general formula (7) represents a trivalent organic group, and $X^2$ in the general formula (8) represents a tetravalent organic group.

As described above, the group represented by $R^3$ is an alkyl group having 1 to 8 carbon atoms, an aryl group or an aromatic heterocyclic group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

The groups represented by $R^4$ and $R^5$ are each independently a hydrogen atom or an alkyl group having 1 to 8 carbon atoms and are specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

The group represented by $R^6$ is an alkyl group having 1 to 8 carbon atoms, an aryl group, a substituted aryl group, an aromatic heterocyclic group, an alkoxy group, an acyl group, an amide group, an oxycarbonyl group, a cyano group, an allyl group or a propargyl group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group. Preferred is a phenyl group.

Examples of the substituted aryl group include substituent-containing phenyl groups and substituent-containing naphthyl groups. Examples of the substituent of the substituent-bearing aryl group include a halogen atom, a hydroxyl group, an alkoxy group, an amino group, a nitro group, a cyano group, a carbonyl-containing group represented by —$COR^{61}$ (where $R^{61}$ is an alkyl group having 1 to 8 carbon atoms, an aryl group, an alkoxy group having 1 to 8 carbon atoms or an aryloxy group), a sulfonyl group, and a trifluoromethyl group. Furthermore, the substituted aryl group is preferably monosubstituted or disubstituted.

Examples of the aromatic heterocyclic group include a pyridyl group, a furyl group, and a thienyl group.

The preferred alkoxy group is a group in which an alkyl group having 1 to 8 carbon atoms is bonded to an oxygen atom, and examples include a methoxy group, an ethoxy group, a propoxy group, an isopropoxy group, an n-butoxy group, a sec-butoxy group, a tert-butoxy group, a pentyloxy group, a hexyloxy group, a heptyloxy group, and an octyloxy group.

Examples of the acyl group include an acetyl group, a propionyl group, and a benzoyl group.

An example of the amide group is —$CONR^{621}R^{622}$ (where $R^{621}$ and $R^{622}$ are each independently a hydrogen atom, an alkyl group having 1 to 8 carbon atoms or an aryl group).

The preferred oxycarbonyl group is a group represented by —$COOR^{63}$ (where $R^{63}$ is a hydrogen atom, an alkyl group having 1 to 8 carbon atoms or an aryl group) and examples include a carboxyl group, a methoxycarbonyl group, an ethoxycarbonyl group, a propioxycarbonyl group, an n-butoxycarbonyl group, a sec-butoxycarbonyl group, a ter-butoxycarbonyl group, an n-pentoxycarbonyl group, and a phenoxycarbonyl group. Preferred oxycarbonyl groups are a methoxycarbonyl group and an ethoxycarbonyl group.

An example of the allyl group is —$CR^{641}R^{642}$—$CR^{643}$=$CR^{644}R^{645}$ (where $R^{641}$ and $R^{642}$ are each independently a hydrogen atom or an alkyl group having 1 to 8 carbon atoms, $R^{643}$, $R^{644}$, and $R^{645}$ are each independently a hydrogen atom, an alkyl group having 1 to 8 carbon atoms or an aryl group, and their respective substituents may be linked by a ring structure).

An example of the propargyl group is —$CR^{651}R^{652}$—C≡$CR^{653}$ (where $R^{651}$ and $R^{652}$ are each a hydrogen atom or an alkyl group having 1 to 8 carbon atoms, and $R^{653}$ is a hydrogen atom, an alkyl group having 1 to 8 carbon atoms, an aryl group or a silyl group).

The group represented as $R^7$ is an alkylene group having 1 to 18 carbon atoms and is specifically as follows.

Examples of the alkylene group having 1 to 18 carbon atoms include: linear or branched alkyl groups, such as a methylene group, an ethylene group, an n-propylene group, an isopropylene group, an n-butylene group, an isobutylene group, an s-butylene group, a t-butylene group, an n-pentylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a n-hexylene group, a 1-methyl-n-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, a 2-ethyl-n-butylene group, a 1,1,2-trimethyl-n-propylene group, a 1,2,2-trimethyl-n-propylene group, a 1-ethyl-1-methyl-n-propylene group, and a 1-ethyl-2-methyl-n-propylene group; and cyclic alkyl groups, such as a cyclopropylene group, a cyclobutylene group, a cyclopentylene group, and a cyclohexylene group. Preferred are linear or branched alkylene groups having 1 to 4 carbon atoms and more preferred are a methylene group and an ethylene group.

The group represented as $X^1$ is an oxygen atom or —NZ—. N represents a nitrogen atom and Z represents a hydrogen atom, an alkyl group having 1 to 8 carbon atoms or a phenyl group. Preferred is —NH—.

There is no particular limitation as to the type of the group represented as $X^2$ so long as it is a polyorganic group and serves to link a plurality of $R^7$s. $X^2$ in the general formula (6) represents a divalent organic group, $X^2$ in the general formula (7) represents a trivalent organic group, and $X^2$ in the general formula (8) represents a tetravalent organic group. Examples of $X^2$ in the general formula (6) include groups represented by —NH—, —CH$_2$—, and —O—. Examples of $X^2$ in the general formula (7) include groups represented by —N<, and —CH<. Examples of $X^2$ in the general formula (8) include groups represented by >C<.

Specifically, examples of the organotellurium compound represented by the general formula (5) include (methyltellanyl-methyl)benzene, (methyltellanyl-methyl)naphthalene, ethyl-2-methyl-2-methyltellanyl-propionate, ethyl-2-methyl-2-n-butyltellanyl-propionate, (2-trimethylsiloxyethyl)-2-methyl-2-methyltellanyl-propionate, (2-hydroxyethyl)-2-methyl-2-methyltellanyl-propionate, and (3-trimethylsilylpropargyl)-2-methyl-2-methyltellanyl-propionate.

If the living radical polymerization is the TERP method, the first vinyl monomer is preferably a vinyl monomer represented by general formula (9).

[Chem. 15]

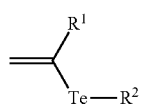

(9)

In the general formula (9), $R^1$ represents a hydrogen atom, an alkyl group having 1 to 8 carbon atoms, an aryl group, an aromatic heterocyclic group, an alkoxy group, an acyl group, an amide group, an oxycarbonyl group, a cyano group, a silyl group or a fluorine atom, and $R^2$ represents an alkyl group having 1 to 8 carbon atoms, an aryl group or an aromatic heterocyclic group.

As described just above, the group represented as $R^1$ is a hydrogen atom, an alkyl group having 1 to 8 carbon atoms, an aryl group, an aromatic heterocyclic group, an alkoxy group, an acyl group, an amide group, an oxycarbonyl group or a cyano group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

The preferred alkoxy group is a group in which an alkyl group having 1 to 8 carbon atoms is bonded to an oxygen atom, and examples include a methoxy group, an ethoxy group, a propoxy group, an isopropoxy group, an n-butoxy group, a sec-butoxy group, a tert-butoxy group, a pentyloxy group, a hexyloxy group, a heptyloxy group, and an octyloxy group.

Examples of the acyl group include an acetyl group, a propionyl group, and a benzoyl group.

An example of the amide group is —CONR$^{111}$R$^{112}$ (where R$^{111}$ and R$^{112}$ are each independently a hydrogen atom, an alkyl group having 1 to 8 carbon atoms or an aryl group).

The preferred oxycarbonyl group is a group represented by —COOR$^{12}$ (where R$^{12}$ is a hydrogen atom, an alkyl group having 1 to 8 carbon atoms or an aryl group) and examples include a carboxyl group, a methoxycarbonyl group, an ethoxycarbonyl group, a propioxycarbonyl group, an n-butoxycarbonyl group, a sec-butoxycarbonyl group, a ter-butoxycarbonyl group, an n-pentoxycarbonyl group, and a phenoxycarbonyl group. Preferred oxycarbonyl groups are a methoxycarbonyl group and an ethoxycarbonyl group.

Examples of the silyl group include a trimethylsilyl group and a triethylsilyl group.

The group represented as $R^2$ is an alkyl group having 1 to 8 carbon atoms, an aryl group or an aromatic heterocyclic group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

Specifically, examples of the vinyl monomer represented by the general formula (9) include 2-methyltellanyl propene, 2-butyltellanyl propene, 2-phenyltellanyl propene, 2-methyltellanyl butene, and 2-butyltellanyl butene.

In the TERP method, depending on the type of the vinyl monomer and for the purpose of promoting the reaction, controlling the molecular weight or other purposes, polymerization may be performed by further adding an azo polymerization initiator and/or an organoditellurium compound represented by general formula (10).

Specifically, examples are methods for polymerizing the first vinyl monomer and the second vinyl monomer using one of the following compounds (a) to (d) to produce a vinyl polymer.

(a) an organotellurium compound,
(b) a mixture of an organotellurium compound and an azo polymerization initiator, (c) a mixture of an organotellurium compound and an organoditellurium compound, and (d) a mixture of an organotellurium compound, an azo polymerization initiator, and an organoditellurium compound.

$$(R^3Te)_2 \qquad (10)$$

In the general formula (10), $R^3$ represents an alkyl group having 1 to 8 carbon atoms, an aryl group or an aromatic heterocyclic group.

Specifically, examples of the organoditellurium compounds represented by the general formula (10) include dimethyl ditelluride, diethyl ditelluride, di-n-propyl ditelluride, diisopropyl ditelluride, dicyclopropyl ditelluride, di-n-butyl ditelluride, di-s-butyl ditelluride, di-t-butyl ditelluride, dicyclobutyl ditelluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride.

Any azo polymerization initiator can be used without particular limitation insofar as it is usable in usual radical polymerization. Examples thereof include 2,2'-azobis-isobutyronitrile (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile) (V-70), 2,2'-azobis(2-methylamidinopropane) dihydrochloride, 2,2'-azobis[2-(2-imidazoline-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

In the polymerization process, depending on the type of the first or second vinyl monomer and for the purpose of promoting the reaction, controlling the molecular weight or other purposes, an azo polymerization initiator and/or an organoditellurium compound are further mixed with the first vinyl monomer, the second vinyl monomer, and the organotellurium compound in a vessel inside of which the atmosphere is replaced with an inert gas. In this case, examples of the inert gas include nitrogen, argon and helium. Argon or nitrogen is preferred. Nitrogen is particularly preferred.

The amount of the second vinyl monomer used in the above cases of (a), (b), (c), and (d) can be appropriately adjusted according to the structure of a desired vinyl polymer. For example, the amount of the second vinyl monomer may be, per mole of organotellurium compound, 10 to 50,000 mol, preferably 25 to 10,000 mole, more preferably 50 to 5,000 mol, and still more preferably 75 to 1,000 mol.

The use ratio of the first vinyl monomer to the second vinyl monomer in the above cases of (a), (b), (c), and (d) can be appropriately adjusted according to the degree of branching of a desired vinyl copolymer. For example, the use ratio of the first vinyl monomer to the second vinyl monomer (first vinyl monomer vs second vinyl monomer) may be, in molar ratio, 0.01:99.99 to 50:50, preferably 0.1:99.9 to 25:75, more preferably 0.1:99.9 to 20:80, and still more preferably 0.5:99.5 to 15:85.

In the case of using an organotellurium compound and an azo polymerization initiator in combination, the amount of azo polymerization initiator used may be, per mole of organotellurium compound, generally 0.01 to 1 mol, preferably 25 to 5,000, and more preferably 50 to 1,000.

In the case of using an organotellurium compound and an organoditellurium compound in combination, the amount of organoditellurium compound used may be, per mole of organotellurium compound, generally 0.1 to 10 mol.

In the case of using an organotellurium compound, an organoditellurium compound, and an azo polymerization initiator in combination, the amount of azo polymerization initiator used may be, per mole of the total of organotellurium compound and organoditellurium compound, generally 0.01 to 10 mol.

The polymerization process can be performed even in the absence of solvent, but may be performed, using a solvent (an aprotic solvent or protic solvent) commonly used for radical polymerization, by stirring the above mixture.

No particular limitation is placed on the type of the aprotic solvent that can be used and examples include benzene, toluene, N,N-dimethylformamide (DMF), dimethyl sulfoxide (DMSO), acetone, 2-butanone (methyl ethyl ketone), dioxane, hexafluoroisopropanol, chloroform, carbon tetrachloride, tetrahydrofuran (THF), ethyl acetate, trifluoromethylbenzene, and propylene glycol monomethyl ether acetate.

Examples of the protic solvent that can be used include water, methanol, ethanol, isopropanol, n-butanol, ethyl cellosolve, butyl cellosolve, 1-methoxy-2-propanol, and diacetone alcohol.

The amount of solvent used is appropriately adjusted and is, for example, per gram of vinyl monomer, generally within a range of 0.001 to 50 ml, preferably within a range of 0.01 to 10 ml, and more preferably within a range of 0.02 to 3 ml.

The reaction temperature and the reaction time are appropriately adjusted depending on the molecular weight or molecular weight distribution of a desired vinyl polymer, but the mixture is generally stirred within a range of 0° C. to 150° C. for 1 minute to 150 hours.

Since the growing ends of the vinyl copolymer to be obtained by the polymerization process have the form of —$TeR^2$ (where $R^2$ is the same as described previously) and —$TeR^3$ (where $R^3$ is the same as described previously) both derived from an organotellurium compound, various substituents or functional groups can be introduced into the growing ends to improve the function of the vinyl polymer. Furthermore, the vinyl copolymer can also be used as a macro-chain transfer agent.

After the end of the polymerization process, the desired vinyl polymer can be extracted by removing the solvent used and the remaining monomer from the polymerization solution under reduced pressure or can be isolated by a repreciptation treatment using a solvent in which the desired vinyl polymer is insoluble.

Operations in the air after the end of the polymerization process gradually deactivate the growing ends of the obtained vinyl polymer, but tellurium atoms may still remain at the growing ends. The vinyl polymer with tellurium atoms remaining at the ends is colored and has poor thermal stability. Then, a radical reduction method using tributylstannane, a thiol compound or the like, a method for adsorbing tellurium atoms with activated carbon, silica gel, activated alumina, activated white earth, molecular sieves, a polymer adsorbent or the like, a method for adsorbing metal with an ion-exchange resin or the like, a liquid-liquid extraction method or solid-liquid extraction method for oxidatively separating tellurium atoms at the ends of the vinyl polymer by addition of a peroxide, such as hydrogen peroxide water or benzoyl peroxide, or injection of air or oxygen into the system and then removing the residual tellurium compound by water rinse or a combination of appropriate solvents, or a solution-phase purification method, such as ultrafiltration for extracting and removing only molecules having a molecular weight equal to or less than a specified molecular weight, can be used or these methods can be variously combined.

(Polymerization Method (ATRP Method))

The method using a transition metal catalyst (ATRP method) is a living radical polymerization method in which an organohalogen compound or a macro-chain transfer agent obtained from the organohalogen compound (both of which are hereinafter collectively referred to as an ATRP initiator) is used as the chain transfer agent in the presence of a redox catalyst made of a transition metal complex. In the ATRP method, one of organohalogen compounds may be selectively used or two or more of them may be used in combination.

The transition metal complex used as the redox catalyst is a complex of a metallic element selected from metals of Group VIII to Group XI in the periodic table. The transition metal complex is formed of a transition metal and an organic ligand. Specific examples of the transition metal include copper, nickel, ruthenium, and iron. Preferred among them is a copper complex from the viewpoints of reaction control and cost. Examples of a univalent copper compound include cuprous chloride, cuprous bromide, cuprous iodide, cuprous cyanide, cuprous oxide, and cuprous perchlorate. Preferred among them are cuprous chloride and cuprous bromide from the viewpoint of polymerization control. Alternatively, polymerization may be performed by adding a reductant to more stable and easier-to-handle cupric chloride or cupric bromide to produce cuprous chloride or cuprous bromide in a polymerization system.

A bidentate or higher-dentate nitrogen ligand is preferred as the organic ligand forming the complex together with the transition metal and examples include 2,2'-bipyridyl, 4,4'-bipyridyl, ethylenediamine, tetramethylethylenediamine, N,N,N',N'',N''-pentamethyldiethylenetriamine, tris[2-(dimethylamino)ethyl]amine, and tris[2-(pyridyl)methyl]amine.

A salt of the transition metal and the organic ligand may be separately added to form a transition metal complex in a polymerization system or a transition metal complex previously prepared from a salt of the transition metal and the organic ligand may be added into a polymerization system. The former is preferred if the transition metal is copper, whereas the latter is preferred if the transition metal is ruthenium, iron or nickel.

Various organic compounds having at least one carbon-halogen bond (where halogen is other than fluorine) in their molecule can be used as the organohalogen compound and examples include aliphatic hydrocarbon-based halides and aromatic hydrocarbon-based halides.

Specific examples of the aliphatic hydrocarbon-based halides include 2-chloropropionamide, 2-bromopropionamide, 2-chloroacetamide, ethyl 2-bromoisobutyrate, methyl 2-bromopropionate, t-butyl 2-bromopropionate, methyl 2-bromoisobutyrate, and 2-hydroxyethyl 2-bromoisobutyrate.

Specific examples of the aromatic hydrocarbon-based halides include benzal chloride, benzyl bromide, 4-bromobenzyl bromide, and benzenesulfonyl chloride.

If the living radical polymerization is the ATRP method, the first vinyl monomer is preferably a vinyl monomer represented by general formula (11).

[Chem. 16]

(11)

In the general formula (11), $R^1$ represents a hydrogen atom, an alkyl group having 1 to 8 carbon atoms, an aryl group, an aromatic heterocyclic group, an alkoxy group, an acyl group, an amide group, an oxycarbonyl group, a cyano group, a silyl group or a fluorine atom, and $Z^2$ represents chlorine or iodine.

As described just above, the group represented as $R^1$ is a hydrogen atom, an alkyl group having 1 to 8 carbon atoms, an aryl group, an aromatic heterocyclic group, an alkoxy group, an acyl group, an amide group, an oxycarbonyl group or a cyano group and is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

The preferred alkoxy group is a group in which an alkyl group having 1 to 8 carbon atoms is bonded to an oxygen atom, and examples include a methoxy group, an ethoxy group, a propoxy group, an isopropoxy group, an n-butoxy group, a sec-butoxy group, a tert-butoxy group, a pentyloxy group, a hexyloxy group, a heptyloxy group, and an octyloxy group.

Examples of the acyl group include an acetyl group, a propionyl group, and a benzoyl group.

An example of the amide group is —$CONR^{111}R^{112}$ (where $R^{111}$ and $R^{112}$ are each independently a hydrogen atom, an alkyl group having 1 to 8 carbon atoms or an aryl group).

The preferred oxycarbonyl group is a group represented by —$COOR^{12}$ (where $R^{12}$ is a hydrogen atom, an alkyl group having 1 to 8 carbon atoms or an aryl group) and examples include a carboxyl group, a methoxycarbonyl group, an ethoxycarbonyl group, a propioxycarbonyl group, an n-butoxycarbonyl group, a sec-butoxycarbonyl group, a ter-butoxycarbonyl group, an n-pentoxycarbonyl group, and a phenoxycarbonyl group. Preferred among them are a methoxycarbonyl group and an ethoxycarbonyl group.

Examples of the silyl group include a trimethylsilyl group and a triethylsilyl group.

In the polymerization process, the first vinyl monomer, the second vinyl monomer, the transition metal complex, and the ATRP initiator are mixed together in a vessel. Reaction during and after the mixing is preferably performed under an inert gas atmosphere, such as nitrogen, argon or helium, in order to prevent side reactions.

The amount of the second vinyl monomer used can be appropriately adjusted according to the physical properties of a desired vinyl polymer. For example, the amount of the second vinyl monomer may be, per mole of ATRP initiator, 10 to 50,000 mol, preferably 25 to 10,000 mole, more preferably 50 to 5,000 mol, and still more preferably 75 to 1,000 mol.

The use ratio of the first vinyl monomer to the second vinyl monomer can be appropriately adjusted according to the degree of branching of a desired vinyl polymer. For example, the use ratio of the first vinyl monomer to the second vinyl monomer (first vinyl monomer vs second vinyl monomer) may be, in molar ratio, 0.01:99.99 to 50:50, preferably 0.1:99.9 to 25:75, more preferably 0.1:99.9 to 20:80, and still more preferably 0.5:99.5 to 15:85.

The amount of the transition metal complex used is, per mole of ATRP initiator, 0.03 to 3 mol and preferably 0.1 to 2 mol. The mount of the organic ligand used is, per mole of transition metal, generally 1 to 5 mol and preferably 1 to 3 mol.

The polymerization process can be performed even in the absence of solvent, but may be performed, using a solvent for use in the ATRP method, by stirring the above mixture.

The reaction temperature and the reaction time are appropriately adjusted depending on the molecular weight or molecular weight distribution of a desired vinyl polymer, but the mixture is generally stirred within a range of 0 to 150° C. for 1 minute to 150 hours.

Since the growing ends of the vinyl polymer to be obtained by the polymerization process have polymerization-initiating groups, various substituents or functional groups can be introduced into the growing ends to improve the function of the vinyl polymer. Furthermore, the vinyl polymer can also be used as a macro-chain transfer agent.

After the end of the polymerization process, the desired vinyl polymer can be extracted by removing the solvent used and the remaining monomer from the polymerization solution under reduced pressure or can be isolated by a reprecipitation treatment using a solvent in which the desired vinyl polymer is insoluble.

<Multibranched Polymer>

A multibranched polymer according to the present invention is a vinyl polymer containing a structural unit derived from a first vinyl monomer having a polymerization-initiating group in an α-position of a vinyl bond and a structural unit derived from a second vinyl monomer free of polymerization-initiating group in an α-position of a vinyl bond. The multibranched polymer according to the present invention can be obtained, for example, by the production method described above.

The absolute molecular weight of the vinyl polymer (multibranched polymer) obtained by the production method according to the present invention can be appropriately adjusted by the reaction time and the amount of the chain transfer agent or the like, but is preferably 1,000 to 3,000,000, more preferably 3,000 to 1,000,000, and still more preferably 5,000 to 500,000.

In the present invention, the absolute molecular weight of the vinyl polymer (multibranched polymer) is a number average molecular weight measured by the nuclear magnetic resonance spectrometry (hereinafter, referred to as "NMR") method or the gel permeation chromatography (hereinafter, referred to as "GPC")/multiangle laser light scattering (MALLS) method and one of these measurement methods suitable for the properties of a vinyl polymer to be obtained may be selected. Alternatively, the number average molecular weight (Mn(MALLS)) by the GPC/MALLS method may be calculated from the weight-average molecular weight (Mw(MALLS)) obtained by the GPC/MALLS method and the molecular weight distribution (PDI) measured by the GPC method.

Because multibranched polymers have small hydrodynamic radii as compared to linear polymers, their molecular weight obtained by the GPC method is estimated to be below their absolute molecular weight. Therefore, the degree of branching of the multibranched polymer can also be determined from the difference between the molecular weight obtained by the GPC method and the absolute molecular weight.

As for the vinyl polymer (multibranched polymer) to be obtained by the production method according to the present invention, its molecular weight distribution (PDI) to be measured by the GPC method can be controlled below 2.5 and is preferably less than 2.3 and more preferably less than 2.0. The PDI is obtained by (the weight-average molecular weight (Mw(GPC)) of the vinyl polymer)/(the number average molecular weight (Mn(GPC)) of the vinyl polymer). As the PDI is smaller, a vinyl polymer having a narrower molecular weight distribution width and therefore closer molecular weights can be obtained. When the PDI value is 1.0, the molecular weight distribution width is narrowest. On the contrary, as the PDI is larger, the vinyl polymer includes portions having small molecular weights or large molecular weights as compared to the designed vinyl polymer molecular weight.

In the vinyl polymer (multibranched polymer) obtained by the production method according to the present invention, the first vinyl monomer can be considered to form branched portions of the multibranched polymer and the degree of branching of the multibranched polymer can be appropriately adjusted by the use ratio of the first vinyl monomer to the second vinyl monomer.

The production method according to the present invention is a method that can be implemented in a one-pot procedure as described above, can provide a multibranched polymer having a narrow molecular weight distribution width by a simple production process, and is industrially advantageous. Furthermore, the multibranched polymer obtained by the production method according to the present invention is highly controlled in branching and a substituent or a functional group can be introduced into its polymer end. Therefore, the multibranched polymer can be suitably used, for example, for healthcare application, such as diagnosis or drug delivery systems, environmental materials for batteries and others, catalyst supports, lubricant additives, and additives for aviation fuel.

EXAMPLES

The present invention will be described below in further detail with reference to specific examples. The present invention is not at all limited by the following examples and modifications and variations may be appropriately made therein without changing the gist of the invention.

Synthesis Example 1

Synthesis of 2-methyltellanyl propene (hereinafter, referred to as VT1) was achieved by the following procedure.

[Chem. 17]

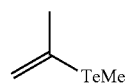

VT1

Magnesium metal (0.27 g, 11 mol) and a piece of iodine were added into a dried, three-necked 100-mL flask fitted with a 50-mL dropping funnel and a reflux tube, the atmosphere in the flask was replaced with nitrogen, and THF (5 mL) was then added into the flask. A solution of 2-bromopropene (0.9 mL, 10 mmol) dissolved in 20 mL of THF was allowed to slowly drop from the dropping funnel into the flask, then stirred at room temperature for two hours, and then cooled to −78° C. Dimethyl ditelluride (1.43 g, 5 mmol) and 20 mL of THF were added into a separately prepared, dried, two-necked 50-mL flask inside of which the atmosphere was replaced with nitrogen, bromine (0.26 mL, 5 mmol) was further added into the flask at 0° C., and the mixture was stirred for 30 minutes. The resultant solution was added to the previously prepared solution using a cannula. The mixed solution was stirred at that temperature for 30 minutes and then immersed in 300 mL of ice water to terminate the reaction. An organic phase was extracted using 30 mL of pentane. This operation was performed five times in total. The collected organic phase was rinsed in 20 mL of water ten times, then dried with $MgSO_4$, and then filtered. The solvent was carefully distilled off and the residue was distilled under reduced pressure (51 to 53° C./33 mmHg), thus obtaining 0.79 g of product. The yield was 43%.

$^1$H-NMR, $^{13}$C-NMR, and IR confirmed that the product was 2-methyltellanyl propene.

Synthesis Example 2

Synthesis of 2-methyltellanyl-1-decene (hereinafter, referred to as VT2) was achieved by the following procedure.

[Chem. 18]

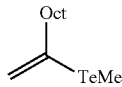

VT2

Under a nitrogen atmosphere, 3.5 mL of diisobutylaluminum hydride (1.0 M toluene solution, 5.3 mmol) was added into a three-necked flask filled with dimethyl ditelluride (0.72 g, 2.5 mol) at room temperature, followed by stirring at 80° C. for 30 minutes. Then, 1-decyne (2.5 mL, 13 mmol) was added into the flask, followed by stirring at 80° C. for 46 hours. An amount of 50 mL of degassed sodium tartrate aqueous solution (0.12 M aqueous solution, 5.9 mmol) was added into the flask to terminate the reaction. An organic phase was extracted using 20 mL of hexane. This operation was performed five times in total. The organic phase was dried with $MgSO_4$, the solvent was distilled off under reduced pressure, and the residue was purified using a dividing GPC, thus obtaining 0.58 g of product. The yield was 48%.

$^1$H-NMR, $^{13}$C-NMR, and IR confirmed that the product was 2-methyltellanyl-1-decene.

Synthesis Example 3

Synthesis of hexyltellanyl ethene (hereinafter, referred to as VT3) was achieved by the following procedure.

[Chem. 19]

VT3

Under a nitrogen gas atmosphere, 1.3 g (10.1 mmol) of metal tellurium was suspended in 10 mL of THF, 10 mL of vinylmagnesium bromide (1.0 M tetrahydrofuran solution, 10 mmol) was added into the suspension at room temperature, followed by stirring for an hour. An amount of 2.4 mL (17.2 mmol) of 1-bromohexane was added to the mixture at 0° C., followed by stirring for two hours. An amount of 50 mL of degassed water was added to the mixture and an organic phase was extracted using 10 mL of diethyl ether. This operation was performed five times in total. The organic phase was dried with $MgSO_4$ and the solvent was distilled off under reduced pressure. The obtained mixture was distilled under reduced pressure (7.8 Torr, 82 to 83° C.), thus obtaining 1.1 g of product. The yield was 45%.

$^1$H-NMR confirmed that the product was hexyltellanyl ethene.

Synthesis Example 4

Synthesis of ethyl-2-methyl-2-methyltellanyl-propionate (hereinafter, referred to as Int1) was achieved by the following procedure.

Under a nitrogen gas atmosphere, 6.38 g (50 mmol) of metal tellurium (manufactured by Aldrich, trade name: Tellurium (−40 mesh)) was suspended in 50 mL of THF, 52.9 mL of methyllithium (1.04 M diethyl ether solution, 55 mmol) was added dropwise into the suspension at room temperature slowly (over 10 minutes). This reaction solution was stirred until metal tellurium disappeared completely (for 20 minutes). An amount of 10.7 g (55 mmol) of ethyl-2-bromo-isobutyrate was added to this reaction solution at room temperature, followed by stirring for two hours. After the completion of the reaction, the solvent was concentrated under reduced pressure and subsequently distilled under reduced pressure, thus obtaining a yellow oily material (6.53 g, 51% yield).

$^1$H-NMR, $^{13}$C-NMR, HRMS, and IR confirmed that the product was ethyl-2-methyl-2-methyltellanyl-propionate.

Synthesis Example 5

A compound (hereinafter, referred to as Int2) represented by the following formula was synthesized by the following procedure.

[Chem. 20]

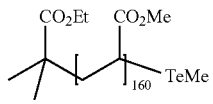

Int2

Under a nitrogen gas atmosphere, Int1 (3.5 μL, 10 mmol) and methyl acrylate (hereinafter, referred to as MA, 0.9 mL, 10 mmol) were charged into a flask with a stirrer and stirred at 60° C. for 15 minutes under irradiation with white LED (6 W). Consumption changes of MA with time (rate of polymerization) were tracked by $^1$H-NMR and the final rate was each 32%.

The obtained Int2 was dissolved in 5 mL of THF, Bu₃SnH (100 μL, 0.4 mmol) was added into the solution, and the solution was stirred at 60° C. for an hour under irradiation with white LED (6 W). The reaction solution was added into 100 mL of hexane, the resultant polymer was reprecipitated (twice) to obtain a polymer. The number average molecular weight (Mn(GPC)) of the obtained polymer by the GPC method was 15,100 and PDI thereof by the GPC method was 1.12.

Synthesis Example 6

A compound (hereinafter, referred to as Int3) represented by the following formula was synthesized by the following procedure.

[Chem. 21]

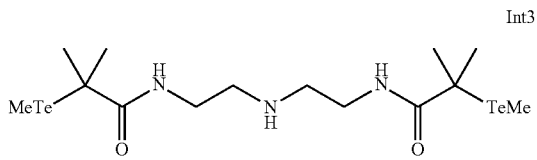

Int3

Under a nitrogen atmosphere, (1-cyano-2-ethoxy-2-oxo-ethylidenaminooxy)dimethylamino-morpholino-carbenium hexafluorophosphate (COMU, 1.1 g, 2.5 mmol) was added into a DMF (10 mL) solution of 2-methyl-2-(methyltellanyl)-propionic acid (0.55 g, 2.5 mmol) and N,N-diisopropylethylamine (DIEA, 0.85 mL, 5.0 mmol), the mixture was stirred at room temperature for 30 minutes, diethylenetriamine (0.14 mL, 1.3 mmol) was then added to the mixture, followed by stirring at room temperature for three hours. Diethyl ether (25 mL) was added to the reaction solution, the solution was rinsed three times with a saturated sodium bicarbonate aqueous solution (10 mL) and rinsed with a saturated sodium chloride aqueous solution (10 mL), an organic phase was then filtered through MgSO₄ and cerite, and the solvent was distilled off under reduced pressure, thus obtaining Int3 at a yield of 90%.

Synthesis Example 7

A compound (hereinafter, referred to as Int4) represented by the following formula was synthesized by the following procedure.

[Chem. 22]

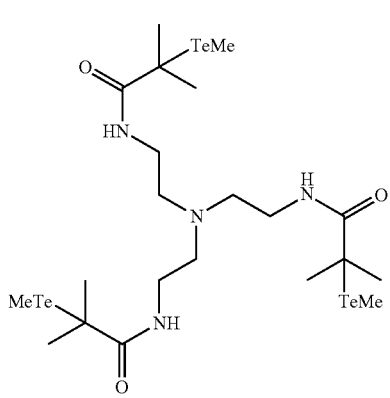

Int4

Under a nitrogen atmosphere, COMU (1.1 g, 2.5 mmol) was added into a DMF (10 mL) solution of 2-methyl-2-(methyltellanyl)-propionic acid (0.55 g, 2.5 mmol) and DIEA (0.85 mL, 5.0 mmol), the mixture was stirred at room temperature for 30 minutes, tris(2-aminoethyl)amine (0.11 mL, 0.75 mmol) was then added to the mixture, followed by stirring at room temperature for three hours. Diethyl ether (25 mL) was added to the reaction solution, the solution was rinsed three times with a saturated sodium bicarbonate aqueous solution (10 mL) and rinsed with a saturated sodium chloride aqueous solution (10 mL), an organic phase was then filtered through MgSO₄ and cerite, and the solvent was distilled off under reduced pressure, thus obtaining Int4 at a yield of 92%.

Synthesis Example 8

A compound (hereinafter, referred to as Int5) represented by the following formula was synthesized by the following procedure.

[Chem. 23]

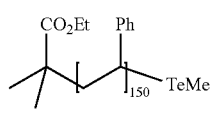

Int5

Under a nitrogen gas atmosphere, Int1 (4.4 μL, 0.025 mmol) and styrene (hereinafter, referred to as St, 0.72 mL, 6.5 mmol) were charged into a flask with a stirrer and stirred at 100° C. for 42 hours. Consumption changes of St with time (rate of polymerization) were tracked by ¹H-NMR and the final rate was 86%.

The obtained Int5 was dissolved in 5 mL of THF, Bu₃SnH (100 μL, 0.4 mmol) was added into the solution, and the solution was stirred at 60° C. for an hour under irradiation with white LED (6 W). The reaction solution was added into 100 mL of hexane, the resultant polymer was reprecipitated (twice) to obtain a polymer. The number average molecular weight (Mn(GPC)) of the obtained polymer by the GPC method was 14,972 and PDI thereof by the GPC method was 1.17.

Synthesis Example 9

A compound (hereinafter, referred to as Inimer 1) represented by the following formula was synthesized by the following procedure.

[Chem. 24]

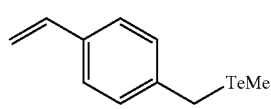

Inimer1

Under a nitrogen gas atmosphere, 0.39 g (3.1 mmol) of metal tellurium was suspended in 3 mL of THF, 1.7 mL of methyllithium (1.75 M pentane solution, 3.0 mmol) was added into the suspension at 0° C., followed by stirring for 15 minutes. An amount of 0.4 mL (2.8 mmol) of 4-vinyl-benzyl chloride was additionally added into the mixture at 0° C., the mixture was stirred for 15 minutes and then added into 50 mL of degassed, saturated aqueous ammonia, and an organic phase was extracted using 40 mL of diethyl ether. The organic phase was rinsed in 20 mL of degassed water four times. The organic phase was dried with $MgSO_4$, the solvent was distilled off under reduced pressure, and the residue was purified by a dividing GPC, thus obtaining 0.43 g of product. The yield was 60%.

$^1$H-NMR and $^{13}$C-NMR confirmed that the product was Inimer 1.

Example 1

MA (0.45 mL, 5 mmol) as the second vinyl monomer, a benzene solution of AIBN (12 μL, 0.002 mmol), and hydroquinone dimethyl ether (3.0 mg, 0.022 mmol) as an internal standard were charged into a flask with a stirrer, the atmosphere in the flask was replaced with nitrogen, Int1 (1.8 μL, 0.01 mmol) as a chain transfer agent and VT1 (19.5 μL, 0.15 mmol) as the first vinyl monomer were then added into the flask, followed by stirring in the dark at 60° C. for 24 hours. Consumption changes of VT1 and MA with time (rates of polymerization) were tracked by $^1$H-NMR and their respective final rates were 99% or more and 89%.

The produced polymer was dissolved in 5 mL of THF, $Bu_3SnH$ (100 μL, 0.4 mmol) was added into the solution, and the solution was stirred at 60° C. for an hour under irradiation with white LED (6 W). The reaction solution was added into 100 mL of hexane and the resultant polymer was reprecipitated (twice) to obtain 0.41 g of polymer.

The obtained polymer (vinyl polymer) was determined in terms of number average molecular weight (Mn(GPC)) and PDI by the GPC method. Furthermore, the weight-average molecular weight (Mw(MALLS)) of the obtained polymer was determined by the GPC/MALLS method, the number average molecular weight (Mn(MALLS)) was calculated from Mw(MALLS) and PDI, and Mn(MALLS) was taken as the absolute molecular weight. The results are shown in Table 1. In addition, the intrinsic viscosity of the obtained polymer determined by a viscometer was 0.0143 L/g.

The molecular structure of the obtained multibranched polymer is shown in FIG. 1.

Example 2

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 3

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 4

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1. In addition, the intrinsic viscosity of the obtained polymer determined by a viscometer was 0.0213 L/g.

Example 5

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1. In addition, the intrinsic viscosity of the obtained polymer determined by a viscometer was 0.0284 L/g.

Example 6

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 7

Polymer production was implemented in the same manner as in Example 1 except that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 8

Polymer production was implemented in the same manner as in Example 1 except that the quantitative ratio among the chain transfer agent, the first vinyl monomer, and the second vinyl monomer and the reaction time were changed as shown in Table 1 and that a benzene solution of AIBN (12 μL, 0.002 mmol) was added after the elapse of 24 hours since the start of stirring in the polymerization process. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 9

Polymer production was implemented in the same manner as in Example 1 except that the quantitative ratio among the

27 chain transfer agent, the first vinyl monomer, and the second vinyl monomer and the reaction time were changed as shown in Table 1 and that a benzene solution of AIBN (12 µL, 0.002 mmol) was added after the elapse of 24 hours since the start of stirring in the polymerization process. Mn(MALLS) as the absolute molecular weight, Mn(GPC), and PDI of the obtained polymer are shown in Table 1.

Example 10

Polymer production was implemented in the same manner as in Example 1 except that the quantitative ratio among the chain transfer agent, the first vinyl monomer, and the second vinyl monomer and the reaction time were changed as shown in Table 1 and that a benzene solution of AIBN (12 µL, 0.002 mmol) was added after the elapse of 11 hours and 71 hours since the start of stirring in the polymerization process. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 11

Polymer production was implemented in the same manner as in Example 1 except that the first vinyl monomer was changed from VT1 to VT2 and that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 12

Polymer production was implemented in the same manner as in Example 1 except that the polymerization initiator was changed from Int1 to Int2 and that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 13

Polymer production was implemented in the same manner as in Example 1 except that the polymerization initiator was changed from Int1 to Int3, that the quantitative ratio among the chain transfer agent, the first vinyl monomer, and the second vinyl monomer and the reaction time were changed as shown in Table 1, and that a benzene solution of AIBN (12 µL, 0.002 mmol) was added after the elapse of 12 hours since the start of stirring in the polymerization process. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

28

Example 14

Polymer production was implemented in the same manner as in Example 1 except that the polymerization initiator was changed from Int1 to Int4, that the quantitative ratio among the chain transfer agent, the first vinyl monomer, and the second vinyl monomer and the reaction time were changed as shown in Table 1, and that a benzene solution of AIBN (12 µL, 0.002 mmol) was added after the elapse of 72 hours since the start of stirring in the polymerization process. Mn(GPC) and PDI of the obtained polymer are shown in Table 1. Furthermore, Mn(MALLS) of the obtained polymer was calculated from Mw(MALLS) and PDI thereof, and Mn(MALLS) was taken as the absolute molecular weight. The results are shown in Table 1.

Example 15

Polymer production was implemented in the same manner as in Example 1 except that the polymerization initiator was changed from Int1 to Int5 and that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, the obtained polymer was determined in term of number average molecular weight (Mn(NMR)) by the NMR method and Mn(NMR) was taken as the absolute molecular weight. The results are shown in Table 1.

Example 16

Polymer production was implemented in the same manner as in Example 1 except that the second vinyl monomer was changed to acrylic acid (AA) and that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, the obtained polymer was determined in term of Mn(NMR) and Mn(NMR) was taken as the absolute molecular weight. The results are shown in Table 1.

Example 17

Polymer production was implemented in the same manner as in Example 1 except that the second vinyl monomer was changed to N,N-dimethylacrylamide (DMAA) and that the quantitative ratio among the chain transfer agent, the first vinyl monomer, and the second vinyl monomer and the reaction time were changed as shown in Table 1. Mn(GPC) and PDI of the obtained polymer are shown in Table 1. Furthermore, the obtained polymer was determined in term of Mn(NMR) and Mn(NMR) was taken as the absolute molecular weight. The results are shown in Table 1.

Example 18

Under a nitrogen atmosphere, Int1 (1.8 µL, 0.01 mmol) as a chain transfer agent, VT3 (32.5 µL, 0.15 mmol) as the first vinyl monomer, methyl methacrylate (hereinafter, referred to as MMA, 0.53 mL, 5 mmol) as the second vinyl monomer, and a benzene solution of AIBN (12 µL, 0.002 mmol) were added into a flask with a stirrer, followed by stirring in the dark at 60° C. for 15 hours. VT 3 and MMA were tracked in terms of changes in rate of polymerization with time by $^1$H-NMR and the obtained polymer was tracked in terms of changes in number average molecular weight (Mn(GPC)) and PDI with time by the GPC method. The results are shown in Table 2.

Comparative Example 1

Polymer production was implemented in the same manner as in Example 1 except that the first vinyl monomer was not used and the reaction time was changed as shown in Table 1. Mn(GPC) and PDI of the obtained polymer are shown in Table 1. Furthermore, Mn (MALLS) of the obtained polymer was calculated from Mw (MALLS) and PDI thereof, and Mn (MALLS) was taken as the absolute molecular weight. The results are shown in Table 1.

Comparative Example 2

Under a nitrogen atmosphere, Int1 (1.8 μL, 0.01 mmol) as a chain transfer agent, Inimer 1 (25 μL, 0.15 mmol), MA (0.45 mL, 5 mmol) as the second vinyl monomer, and a benzene solution of AIBN (12 μL, 0.002 mmol) were added into a flask with a stirrer, followed by stirring in the dark at 60° C. for 56 hours. Inimer 1 and MA were tracked in terms of changes in rate of polymerization with time by $^1$H-NMR and the obtained polymer was tracked in terms of changes in number average molecular weight (Mn(GPC)) and PDI with time by the GPC method. The results are shown in Table 2.

Comparative Example 3

Under a nitrogen atmosphere, Inimer 1 (25 μL, 0.15 mmol), MA (0.45 mL, 5 mmol) as the second vinyl monomer, and a benzene solution of AIBN (12 μL, 0.002 mmol) were added into a flask with a stirrer, followed by stirring in the dark at 60° C. for 56 hours. Inimer 1 and MA were tracked in terms of changes in rate of polymerization with time by $^1$H-NMR and the obtained polymer was tracked in terms of changes in number average molecular weight (Mn(GPC)) and PDI with time by the GPC method. The results are shown in Table 2.

TABLE 1

| | Material Molar Ratio | | | | | | | | | | Reaction Time | Rate of Polymerization | | Vinyl Polymer | | |
|---|---|---|---|---|---|---|---|---|---|---|---|---|---|---|---|---|
| | Chain Transfer Agent | | | | | First Vinyl Monomer | | Second Vinyl Monomer | | | | First Vinyl Monomer | Second Vinyl Monomer | Absolute Molecular Weight [×10$^{-4}$] | Mn (GPC) [×10$^{-4}$] | PDI |
| | Int1 | Int2 | Int3 | Int4 | Int5 | VT1 | VT2 | MA | AA | DMAA | | | | | | |
| Ex. 1 | 1 | | | | | 15 | | 500 | | | 24 hrs. | 99% or more | 89% | 5.36 | 1.59 | 1.99 |
| Ex. 2 | 1 | | | | | 15 | | 250 | | | 66 hrs. | 99% or more | 94% | 2.40 | 1.20 | 1.87 |
| Ex. 3 | 1 | | | | | 15 | | 100 | | | 66 hrs. | 99% or more | 92% | 0.91 | 0.56 | 1.40 |
| Ex. 4 | 1 | | | | | 7 | | 500 | | | 20 hrs. | 99% or more | 94% | 5.75 | 3.34 | 1.48 |
| Ex. 5 | 1 | | | | | 3 | | 500 | | | 20 hrs. | 99% or more | 97% | 5.22 | 4.11 | 1.59 |
| Ex. 6 | 1 | | | | | 3 | | 100 | | | 24 hrs. | 99% or more | 98% | 1.16 | 0.81 | 1.62 |
| Ex. 7 | 1 | | | | | 1 | | 500 | | | 20 hrs. | 99% or more | 98% | 4.61 | 4.89 | 1.51 |
| Ex. 8 | 1 | | | | | 31 | | 500 | | | 84 hrs. | 99% or more | 90% | 5.60 | 1.71 | 1.97 |
| Ex. 9 | 1 | | | | | 63 | | 500 | | | 120 hrs. | 95% | 74% | 5.39 | 0.98 | 1.99 |
| Ex. 10 | 1 | | | | | 126 | | 2000 | | | 132 hrs. | 99% or more | 90% | 5.69 | 17.65 | 2.08 |
| Ex. 11 | 1 | | | | | | 15 | 500 | | | 72 hrs. | 99% or more | 84% | 5.41 | 2.18 | 1.80 |
| Ex. 12 | | 1 | | | | 15 | | 500 | | | 43 hrs. | 99% or more | 92% | 5.42 | 2.95 | 1.49 |
| Ex. 13 | | | 1 | | | 30 | | 500 | | | 80 hrs. | 99% or more | 97% | 4.67 | 1.74 | 1.89 |
| Ex. 14 | | | | 1 | | 21 | | 500 | | | 168 hrs. | 99% or more | 84% | 5.66 | 1.73 | 1.44 |
| Ex. 15 | | | | | 1 | 15 | | 500 | | | 36 hrs. | 99% or more | 84% | 3.33 | 2.66 | 1.39 |
| Ex. 16 | 1 | | | | | 15 | | | 250 | | 24 hrs. | 99% or more | 34% | 1.02 | 0.54 | 2.02 |
| Ex. 17 | 1 | | | | | 15 | | | | 500 | 7 hrs. | 81% | 86% | 3.60 | 2.02 | 1.45 |
| Comp. Ex. 1 | 1 | | | | | 0 | | 500 | | | 2 hrs. | — | 90% | 3.72 | 3.96 | 1.12 |

TABLE 2

| | | Inimer | | | | | | |
| | | Inimer1 | | | | Vinyl Polymer | |
| | Reaction Time | Polymer Initiating Portion | Vinyl Portion | First Vinyl Monomer VT3 | Second Vinyl Monomer MA | Second Vinyl Monomer MMA | Mn (GPC) | PDI |
|---|---|---|---|---|---|---|---|---|
| Ex. 18 | 3 hrs. | | | 7% | | 16% | 8203 | 1.63 |
| | 9 hrs. | | | 27% | | 47% | 17555 | 1.75 |
| | 15 hrs. | | | 76% | | 90% | 23181 | 1.78 |
| Comp. Ex. 2 | 3 hrs. | 99% or more | 17% | | 13% | | n.d. | n.d. |
| | 9 hrs. | 99% or more | 60% | | 24% | | 1085 | 2.58 |
| | 56 hrs. | 99% or more | 99% or more | | 85% | | 7255 | 2.64 |
| Comp. Ex. 3 | 3 hrs. | 99% or more | 12% | | 4% | | n.d. | n.d. |
| | 9 hrs. | 99% or more | 66% | | 14% | | 1369 | 2.79 |
| | 56 hrs. | 99% or more | 99% or more | | 71% | | 14331 | 2.95 |

FIG. 2 is a graph showing GPC traces over time in Example 1. As shown in FIG. 2, the GPC trace was always unimodal, which shows that the branching was controlled.

As seen from the results of Examples 1, 4, 5, and 7 to 9 shown in Table 1, with increasing amount of first vinyl monomer used, Mn(GPC) tends to decrease but the absolute molecular weight does not significantly change. This shows that the degree of branching increases with increasing amount of first vinyl monomer used. The results of Examples 1 to 3 show that Mn(GPC) and the absolute molecular weight increase with increasing amount of second vinyl monomer used, which shows that the molecular weight increases with increasing amount of second vinyl monomer used. Furthermore, the results of Examples 1, 4, and 5 show that the intrinsic viscosity decreases with increasing degree of branching.

The results of Comparative Examples 2 and 3 in which the inimer shown in Table 2 was used show that the consumption of the inimer predominantly early occurred as compared to the consumption of the second vinyl monomer, for which reason the degree of branching was first large but branching disappeared quickly. Unlike the above, in Example 18 in which the first vinyl monomer was used, PDI was always below 2.5 and the consumptions of the first vinyl monomer and the second vinyl monomer occurred at almost equal rates, which shows that a polymer having a constant branching density was obtained.

The invention claimed is:

1. A method for producing a multibranched polymer, the method comprising the step of polymerizing a first vinyl monomer having a polymerization-initiating group in an α-position of a vinyl bond and a second vinyl monomer free of polymerization-initiating group in an α-position of a vinyl bond by a living radical polymerization wherein said polymerization-initiating group is capable of initiating living radical polymerization.

2. The method for producing a multibranched polymer according to claim 1, wherein the living radical polymerization is a living radical polymerization in which an organotellurium compound represented by the following general formula (5), general formula (6), general formula (7) or general formula (8) or a macro-chain transfer agent obtained from the organotellurium compound is used as a chain transfer agent,

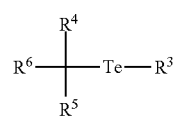

(5)

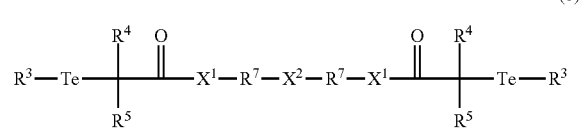

(6)

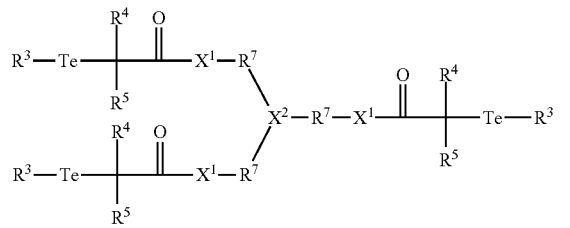

(7)

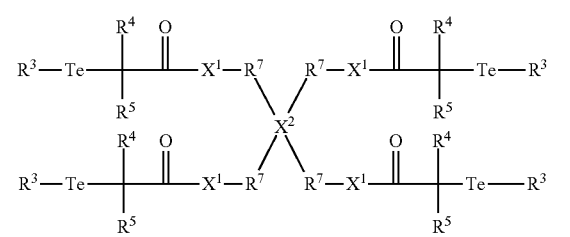

(8)

wherein in the general formulae (5) to (8), $R^3$ represents an alkyl group having 1 to 8 carbon atoms, an aryl group or an aromatic heterocyclic group, $R^4$ and $R^5$ each independently represent a hydrogen atom or an alkyl group having 1 to 8 carbon atoms, $R^6$ represents an alkyl group having 1 to 8 carbon atoms, an aryl group, a substituted aryl group, an aromatic heterocyclic group, an alkoxy group, an acyl group, an amide group, an oxycarbonyl group a cyano group, an allyl group or a propargyl group, $R^7$ represents an alkylene group having 1 to 18 carbon atoms, $X^1$ represents an oxygen atom or —NZ— where N represents a nitrogen atom and Z represents s hydrogen atom, an alkyl group having 1 to 8 carbon atoms or a phenyl group, $X^2$ in the general formula (6) represents a divalent organic group, $X^2$ in the general formula (7) represents a trivalent organic group, and $X^2$ in the general formula (8) represents a tetravalent organic group.

3. The method for producing a multibranched polymer according to claim 1, wherein the first vinyl monomer is a vinyl monomer represented by general formula (9) below,

(9)

wherein in the general formula (9), $R^1$ represents a hydrogen atom, an alkyl group having 1 to 8 carbon atoms, an aryl group, an aromatic heterocyclic group, an alkoxy group, an acyl group, an amide group, an oxycarbonyl group or a cyano group, and $R^2$ represents an alkyl group having 1 to 8 carbon atoms, an aryl group, an aromatic heterocyclic group, a silyl group or a fluorine atom.

4. The method for producing a multibranched polymer according to claim 1, wherein a use ratio of the, first vinyl monomer vs second vinyl monomer, is, in molar ratio, 0.01:99.99 to 50:50.

* * * * *